United States Patent [19]
Gogoi et al.

[11] Patent Number: 6,156,585
[45] Date of Patent: Dec. 5, 2000

[54] SEMICONDUCTOR COMPONENT AND METHOD OF MANUFACTURE

[75] Inventors: Bishnu P. Gogoi, Scottsdale; David J. Monk, Mesa, both of Ariz.

[73] Assignee: Motorola, Inc., Schaumburg, Ill.

[21] Appl. No.: 09/017,494

[22] Filed: Feb. 2, 1998

[51] Int. Cl.[7] .................................................. H01L 21/00
[52] U.S. Cl. ................................ 438/48; 438/52; 438/53; 438/753
[58] Field of Search .................................. 438/48, 50, 52, 438/53, FOR 412, 753; 216/2

[56] References Cited

U.S. PATENT DOCUMENTS

| | | | |
|---|---|---|---|
| 3,853,650 | 12/1974 | Hartlaub | 148/187 |
| 4,257,274 | 3/1981 | Shimada et al. | 73/718 |
| 4,784,721 | 11/1988 | Holmen et al. | 216/2 |
| 4,961,821 | 10/1990 | Drake et al. | 438/701 |
| 5,189,777 | 3/1993 | Guckel et al. | 29/424 |
| 5,262,000 | 11/1993 | Welbourn et al. | 216/2 |
| 5,277,068 | 1/1994 | Fukiura et al. | 73/724 |
| 5,332,469 | 7/1994 | Mastrangelo | 73/724 |
| 5,344,523 | 9/1994 | Fung et al. | 156/628 |
| 5,357,807 | 10/1994 | Guckel et al. | 73/721 |
| 5,424,650 | 6/1995 | Frick | 73/718 |
| 5,470,797 | 11/1995 | Mastrangelo | 73/718 |
| 5,479,827 | 1/1996 | Kumura et al. | 73/718 |
| 5,507,080 | 4/1996 | Hayashi et al. | 73/724 |
| 5,888,845 | 3/1999 | Bashir et al. | 438/53 |

FOREIGN PATENT DOCUMENTS 0691677 1/1996 Germany.

OTHER PUBLICATIONS

J.T. Kung et al., "An Integrated Air–Gap–Capacitor Process for Sensor Applications", IEEE, 1991 International Conference on Solid–State Sensors and Actuators—Digest of Technical Papers, May 1991, pp. 1010–1013.

H. Guckel et al., "Microstructure Sensors", IEDM Technical Digest—International Electron Devices meeting, San Francisco—CA, Dec. 9–12, 1990, pp. 26.1.1–26.1.4.

Jesper Bay et al., "Design of a Silicon Microphone with Differential Read–Out of a Sealed Double Parallel–Plate Capacitor" The 8th International Conference on Solid–State Sensors and Actuators–Eurosensors IX, Digest of Technical Papers, vol. 2, Sessions A7–D13, Papers 232–496, Jun. 25–29, 1995, pp. 700–703.

Primary Examiner—Michael Trinh
Attorney, Agent, or Firm—Robert F. Hightower

[57] ABSTRACT

A semiconductor component comprises a substrate (101), a two flexible pressure sensor diaphragms (106, 303) supported by the substrate (101), and a fixed electrode (203) between the two diaphragms (106, 303). The two diaphragms (106, 303) and the fixed electrode (203) are electrodes of two differential capacitors. The substrate (101) has a hole (601) extending from one surface (107) of the substrate (101) to an opposite surface (108) of the substrate (101). The hole (601) is located underneath the two diaphragms (106, 303), and the hole (601) at the opposite surfaces (107, 108) of the substrate (101) is preferably larger than the hole (601) at an interior portion of the substrate (101).

6 Claims, 3 Drawing Sheets

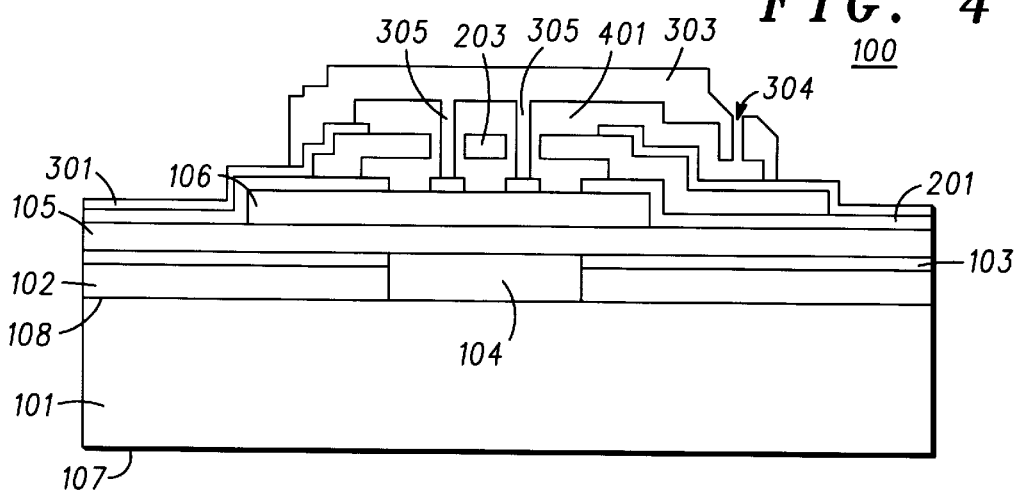
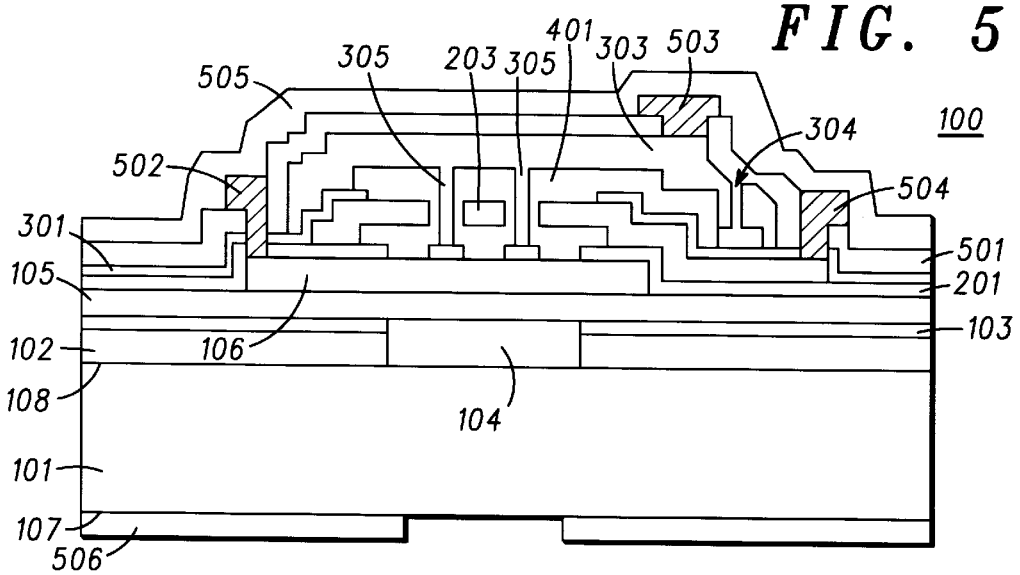
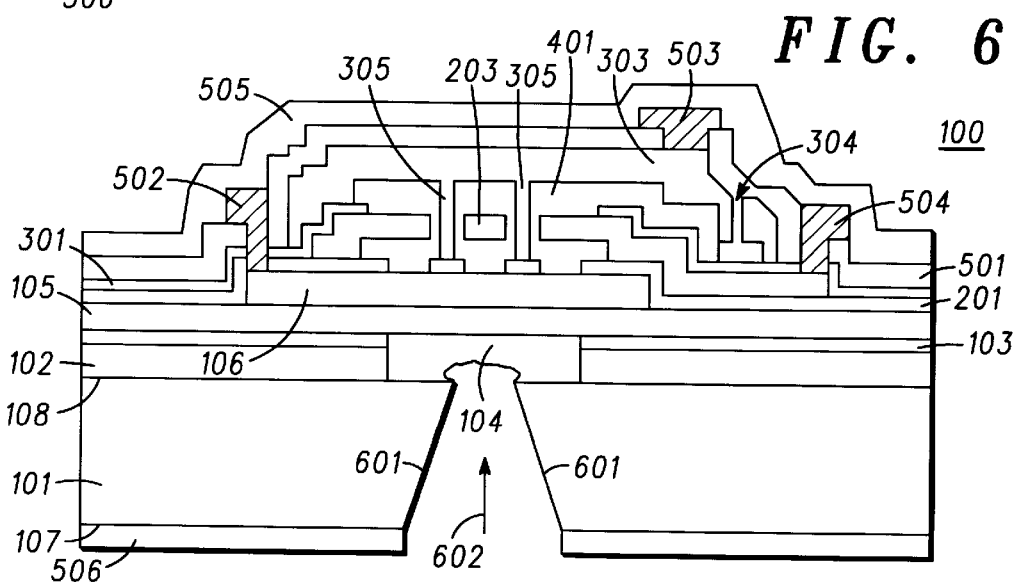

SEMICONDUCTOR COMPONENT AND METHOD OF MANUFACTURE

BACKGROUND OF THE INVENTION

This invention relates, in general, to electronic components, and more particularly, to semiconductor components.

Differential capacitive pressure sensors typically have a fixed electrode, a single pressure-movable diaphragm electrode, and a small gap separating the two electrodes wherein the gap is exposed to the pressure sensing environment. During sensor operation, a change in pressure deflects the diaphragm electrode and modifies the size of the gap between the two electrodes, which changes the capacitance measured between the two electrodes.

However, these capacitive pressure sensors are highly susceptible to particulate contamination because dust and other particulates can easily become trapped in the gap. The particulates come from ambient during sensor fabrication, assembly, and from the gas or liquid pressure sensing media during sensor operation. The particulates prevent the diaphragm electrode from moving properly in response to changes in pressure.

Furthermore, when the pressure sensing environment is ambient, the prior art capacitive pressure sensors are also susceptible to humidity and other forms of moisture in the ambient because the moisture changes the dielectric constant of the air between the two electrodes. Therefore, humidity variations change the capacitance measured by the sensor even when the ambient pressure remains constant.

Moreover, some differential capacitive pressure sensors also require large support substrates that waste space and increase the cost of the sensors.

Accordingly, a need exists for smaller and cost-effective pressure sensors that are not susceptible to particulates or moisture from the pressure sensing environments.

BRIEF DESCRIPTION OF THE DRAWINGS

FIGS. 1 through 8 illustrate cross-sectional views of an embodiment of an electronic component after different stages of fabrication in accordance with the present invention.

For simplicity and clarity of illustration, elements in the drawings are not necessarily drawn to scale. Furthermore, the same reference numerals in different figures denote the same elements.

DETAILED DESCRIPTION OF THE DRAWINGS

Figure 1:
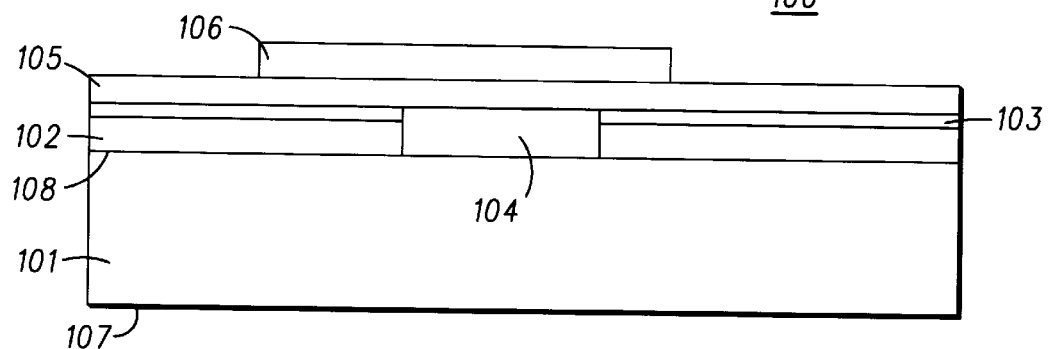

FIG. 1 illustrates an embodiment of an electronic component 100 after several initial manufacturing steps. Component 100 includes a substrate 101 having a bottom surface 107 and a top surface 108 opposite surface 107. Substrate 101 is used to support a sealed composite hollow diaphragm or a capacitive pressure sensor diaphragm, as explained hereinafter. Substrate 101 can be comprised of a semiconductor material such as silicon, germanium, gallium arsenide, or the like. However, in the preferred embodiment, substrate 101 comprises a silicon substrate having a single-crystalline structure for reasons explained hereinafter.

Isolation and etch stop layers 102 and 103 are sequentially disposed over surface 108 of substrate 101 using, for example, thermal growth, vapor deposition, or other similar techniques. Layers 102 and 103 provide electric and parasitic isolation between substrate 101 and the sealed hollow composite diaphragm (explained hereinafter) formed over substrate 101. Therefore, the use of layers 102 and 103 enables an integrated circuit to be formed in substrate 101 to provide on-chip pressure measurements and calculations. Layers 102 and 103 also serve as etch stops during a subsequent etching of substrate 101, described hereinafter. In the preferred embodiment, layer 102 comprises approximately one to three micrometers of a dielectric such as silicon oxide, and layer 103 comprises less than approximately half of a micrometer of a different dielectric such as silicon nitride.

Next a hole is formed into layers 102 and 103 using wet or dry etching techniques. The hole can be approximately one hundred to one thousand micrometers wide. Then, a hole-widening layer 104 is disposed into the hole and over surface 108 of substrate 101 using, for example, a vapor deposition technique. Layer 104 enables a wider hole to be etched into substrate 101, as described hereinafter. Layer 104 preferably comprises a material that is isotropically etchable by the same etchant that anisotropically etches substrate 101. In the preferred embodiment, layer 104 comprises approximately one and a half to three and a half micrometers of silicon having a polycrystalline structure, known in the art as polysilicon. A planarizing technique, such as chemical-mechanical polishing, can be used to flatten the top surface of the semiconductor structure after the deposition of layer 104.

Then, an etch stop 105 is disposed over layers 103 and 104. In the preferred embodiment, etch stop 105 comprises less than approximately half of a micrometer of a dielectric such as silicon nitride. Subsequently, a diaphragm 106 is disposed overlying etch stop 105. Diaphragm 106 serves as a bottom diaphragm of the sealed composite hollow diaphragm and also serves as the bottom electrode of the differential pressure sensing portion of component 100. In the preferred embodiment, diaphragm 106 is formed by depositing and then patterning approximately one to three micrometers of an electrically conductive material such as doped polysilicon.

Figure 2:
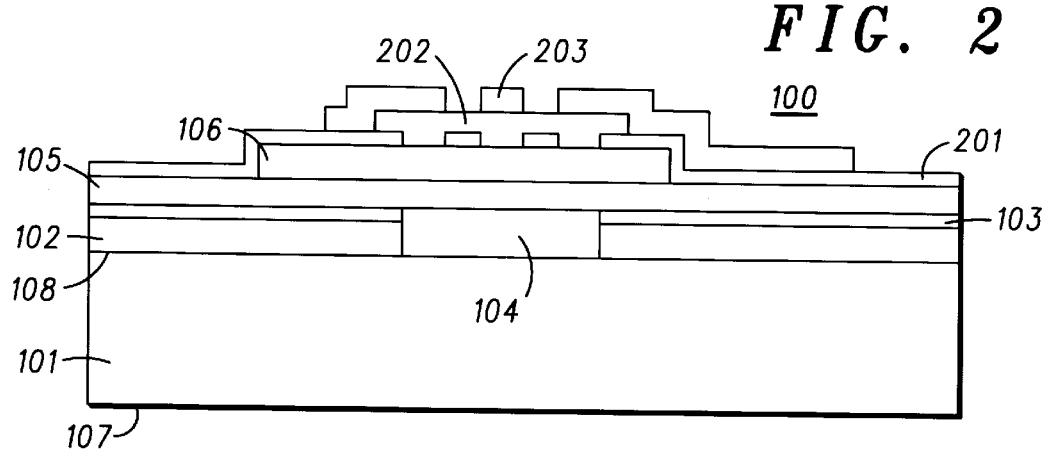

FIG. 2 illustrates component 100 after several additional manufacturing steps. An isolation layer 201 is deposited over diaphragm 106 and etch stop 105. Layer 201 is patterned with holes to expose portions of diaphragm 106. Layer 201 electrical isolates diaphragm 106 from an overlying fixed electrode (described hereinafter). In the preferred embodiment, layer 201 comprises less than approximately half of a micrometer of a dielectric such as silicon nitride.

After the patterning of layer 201, a sacrificial layer 202 is deposited and patterned over diaphragm 106 and layer 201. Layer 202 is formed in and over the holes of layer 201 to directly or physically contact diaphragm 106. The subsequent complete removal of layer 202 enables diaphragm 106 to be movable independent of a fixed electrode (described hereinafter). Layer 202 preferably comprises a material that can be wet etched selectively over layer 201 and diaphragm 106. In the preferred embodiment, layer 202 comprises approximately one to three micrometers of a dielectric such as silicon oxide, phosphosilicate glass, or the like.

A fixed electrode 203 is formed overlying diaphragm 106 and layers 201 and 202. Fixed electrode 203 serves as a central immobile electrode for the differential pressure sensing portion of component 100. Electrode 203 is electrically isolated from diaphragm 106 by isolation layer 201. Electrode 203 is patterned with a set or plurality of holes to expose portions of sacrificial layer 202. The holes of electrode 203 are aligned over different regions of isolation layer 201 and preferably do not overlie the holes of isolation layer 201. In the preferred embodiment, electrode 203 comprises approximately one to three micrometers of a similar material used for diaphragm 106, and the holes of electrode 203 are each approximately two to ten micrometers wide.

Figure 3:
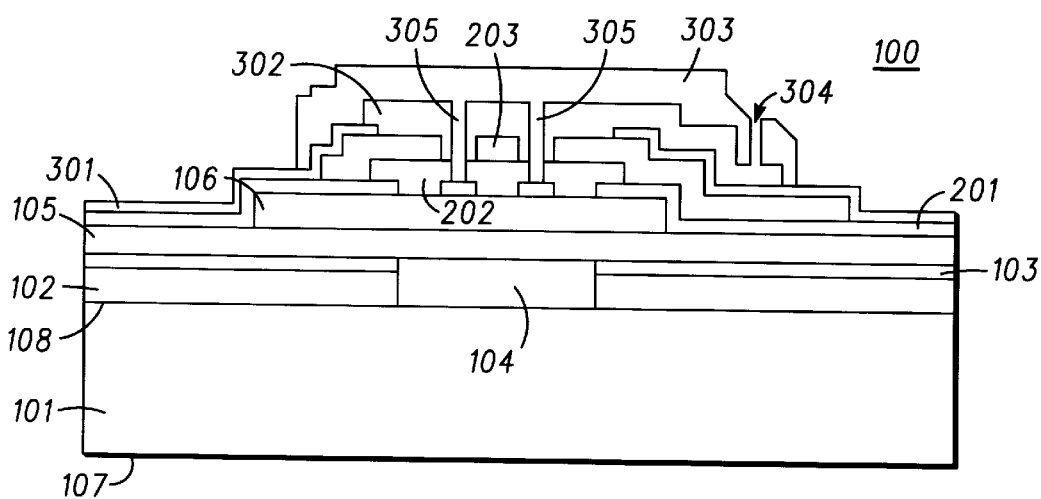

FIG. 3 illustrates component 100 after subsequent processing. An isolation layer 301 is disposed over fixed electrode 203 and isolation layer 201. Layer 301 electrically isolates fixed electrode 203 from a subsequently formed diaphragm electrode (explained hereinafter). Layer 301 is patterned with an opening to expose the holes of fixed electrode 203. In an alternative embodiment, layer 301 is patterned with separate openings for each of the holes of fixed electrode 203. In the preferred embodiment, layer 301 comprises less than approximately half of a micrometer of a similar material used for layer 201.

Next, a sacrificial layer 302 is deposited over layer 301, over fixed electrode 203, in the opening of layer 301, and in the holes of fixed electrode 203 to physically contact sacrificial layer 202. The subsequent complete removal of layer 302 enables a subsequently formed diaphragm (explained hereinafter) to be movable independent of fixed electrode 203. In the preferred embodiment, sacrificial layer 302 comprises approximately one to three micrometers of a similar material used for sacrificial layer 202 so that layer 302 can be removed with the same etchant as layer 202 without substantially etching layers 201 and 301, diaphragm 106, or electrode 203.

A first etch mask (not shown) is formed over layers 302 and 301 to define the outer perimeter of layer 302. After an etching step and the removal of the first etch mask, a second etch mask (not shown) is formed over layers 302 and 301 before anisotropically etching a set or plurality of holes into sacrificial layers 302 and 202. The holes overlie, fit within, and extend through the holes of fixed electrode 203. Layer 201 serves as an etch stop for this anisotropic etching step. In the preferred embodiment, the holes of this etching step are approximately two to ten micrometers wide and are concentric with the holes of fixed electrode 203.

After the removal of the second etch mask, a diaphragm 303 is formed over sacrificial layer 302, isolation layer 301, fixed electrode 203, and diaphragm 106. Diaphragm 303 serves as a top electrode for the pressure sensing portion of component 100. Diaphragm 303 is electrically isolated from fixed electrode 203 by isolation layer 301. Diaphragm 303 also has at least one hole 304 to expose a portion of sacrificial layer 302. Hole 304 preferably does not overlie a central portion of layer 104 for reasons explained hereinafter. Diaphragm 303 is preferably formed by depositing and then patterning approximately two to twelve micrometers of a similar material used for diaphragm 106 and electrode 203.

The material used for diaphragm 303 is also deposited into the holes of sacrificial layers 302 and 202 to form a plurality of support pillars, columns, beams, or posts 305 for diaphragm 303. Posts 305 are preferably about one to ten micrometers wide and about ten to fifty micrometers apart from each other to prevent localized deflections of diaphragms 106 and 303, as explained in more detailed hereinafter. Posts 305 are electrically isolated from diaphragm 106 by isolation layer 201. Although only two posts are portrayed in FIG. 3, it is understood that the specific number of posts depends upon the size of diaphragms 303 and 106 wherein larger diaphragms requires more posts.

FIG. 4 illustrates component 100 after further manufacturing. Sacrificial layers 302 and 202 are removed to create a cavity 401 between diaphragms 106 and 303 wherein fixed electrode 203 and posts 305 remains in cavity 401. Hole 304 in diaphragm 303 permits an etchant to contact and etch sacrificial layer 302, and the holes in fixed electrode 203 permit an etchant to contact and etch sacrificial layer 202. To simplify the removal process, a single etchant can be used to etch both sacrificial layers 302 and 202 while diaphragms 106 and 303, posts 305, isolation layers 201 and 301, and fixed electrode 203 remain substantially unaffected by the etchant. In the preferred embodiment, a wet etchant comprising hydrofluoric acid, buffered hydrofluoric acid, or the like is used to selectively etch layers 302 and 202 over diaphragms 106 and 303, posts 305, isolation layers 201 and 301, and fixed electrode 203. Although only one etch hole is portrayed in FIG. 4, it is understood that the specific number of etch holes depends on the size of diaphragms 106 and 303 wherein larger diaphragms require more etch holes.

After removing sacrificial layers 302 and 202, isolation layers 201 and 301 keep fixed electrode 203 electrically isolated from and diaphragms 106 and 303, respectively. The thickness of layers 302 and 202 before their removal determines the final spacing between diaphragm 303 and electrode 203 and between electrode 203 and diaphragm 106, respectively. After removing layers 302 and 202, fixed electrode 203 is preferably not supported by the inner surfaces or walls of cavity 401. Instead, electrode 203 is preferably more securely supported by isolation layer 201, diaphragm 106, and substrate 101.

Following the formation of cavity 401, an anti-stiction process can be performed to prevent the stiction of fixed electrode with diaphragms 106 and 303 during the operation of component 100. The anti-stiction processes or structures can include, for example, stand-offs, dimples, freeze-drying techniques, supercritical carbon dioxide drying, or anti-stiction coatings.

FIG. 5 illustrates component 100 after further manufacturing steps. A cavity sealing layer 501 is deposited over diaphragm 303, over isolation layer 301, and in hole 304. Layer 501 seals cavity 401 and prevents cavity 401 and fixed electrode 203 from being exposed to ambient. In the preferred embodiment, layer 501 comprises about a half to four micrometers of silicon oxide. Also in the preferred embodiment, the pressure in cavity 401 is approximately thirty milli-Torr to one Torr, which can be achieved by drawing the deposition chamber to approximately thirty milli-Torr to one Torr before and during the deposition of layer 501.

Next, a first contact hole is sequentially etched into layers 501, 301, and 201 to permit the formation of electrical contact 502. A second contact hole is also etched into layer 501 to permit the formation of electrical contact 503. A third contact hole is sequentially etched into layers 501 and 301 to permit the formation of electrical contact 504. One, two, or three separate etch masks may be used to etch the three contact holes. In the preferred embodiment, electrical contacts 502, 503, and 504 comprise materials that are used for source and drain contacts in conventional metal-oxide-semiconductor field-effect transistors. As an example, contacts 502, 503, and 504 can comprise aluminum silicon.

A first protection layer or etch mask 505 is formed over surface 108 of substrate 101, cavity sealing layer 501, electrical contacts 502, 503, and 504, and the semiconductor structure comprising diaphragms 106 and 303 and fixed electrode 203. Etch mask 505 is devoid of any openings or holes and continuously covers substantially all of surface 108. A second protection layer or etch mask 506 is formed over surface 107 of substrate 101. Etch mask 506 has an opening directly underlying hole-widening layer 104 and exposes a portion of substrate 101 along surface 107. Substrate 101 can be thinned from surface 107 before depositing etch mask 506 over surface 107. In the preferred embodiment, etch masks 505 and 506 comprise approximately a half to two micrometers of silicon nitride.

Figure 7:
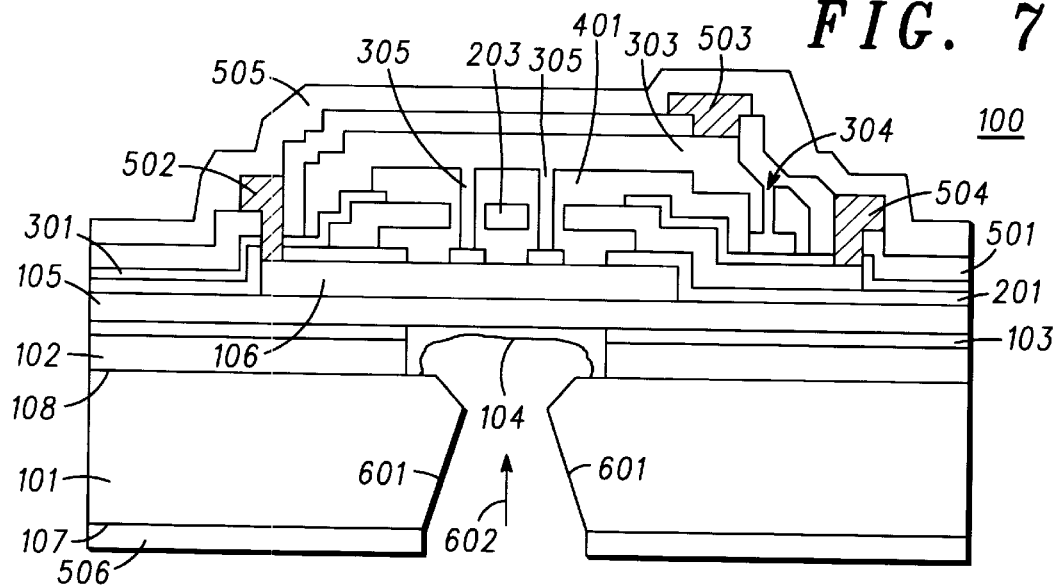

FIGS. 6 and 7 illustrate component 100 during a subsequent etching step. After the formation of etch masks 505 and 506, a cavity or hole 601 is etched into substrate 101 beginning from the exposed portion of surface 107. In the preferred embodiment, an anisotropic wet etchant 602 such as potassium hydroxide or tetra-methyl-ammonium hydroxide is used to etch hole 601 into substrate 101. In this preferred embodiment, substrate 101 will be etched along the <100> crystal plane, and the sidewalls of hole 601 will form a 54.7 degree angle with surface 107 of substrate 101.

As hole 601 reaches cavity-widening layer 104 in the preferred embodiment, etchant 602 will isotropically etch layer 104. Because of the isotropic etching of layer 104, a portion of surface 108 will be exposed to etchant 602, as portrayed in FIG. 6. Additionally, as this portion of surface 108 is exposed to etchant 602, etchant 602 will anisotropically etch substrate 101 along the <100> crystal plane from surface 108, as portrayed in FIG. 7. Eventually, all of layer 104 is removed by etchant 602, and the size of hole 601 is widened at surface 108.

In this etching step, etch masks 505 and 506, layers 102 and 103, and etch stop 105 are preferably all etch-resistant to etchant 602. Etch mask 505 prevents etchant 602 from directly etching layer 104 and surface 108 of substrate 101. Instead, etchant 602 is supplied to layer 104 and surface 108 only through hole 601 from surface 107 of substrate 101.

This preferred etching embodiment of FIGS. 6 and 7 reduces the size of component 100 because the portions of hole 601 at surfaces 107 and 108 of substrate 101 are larger or wider than other portions of hole 601 at inner, interior, middle, or central portions of substrate 101. To achieve the smallest component 100, the opening in etch mask 506 is preferably approximately the same size as hole-widening layer 104.

In an alternative embodiment, a dry etching technique or other bulk micromachining techniques can be used in place of or in combination with the aforementioned wet etching technique. As an example, a dry etchant can be used to initially etch hole 601 from surface 107 to a point within substrate 101. Next, a second etchant can be used to etch further into substrate 101, to remove layer 104 and expose a portion of surface 108 of substrate 101, and to isotropically etch the remaining portion of hole 601.

Figure 8:
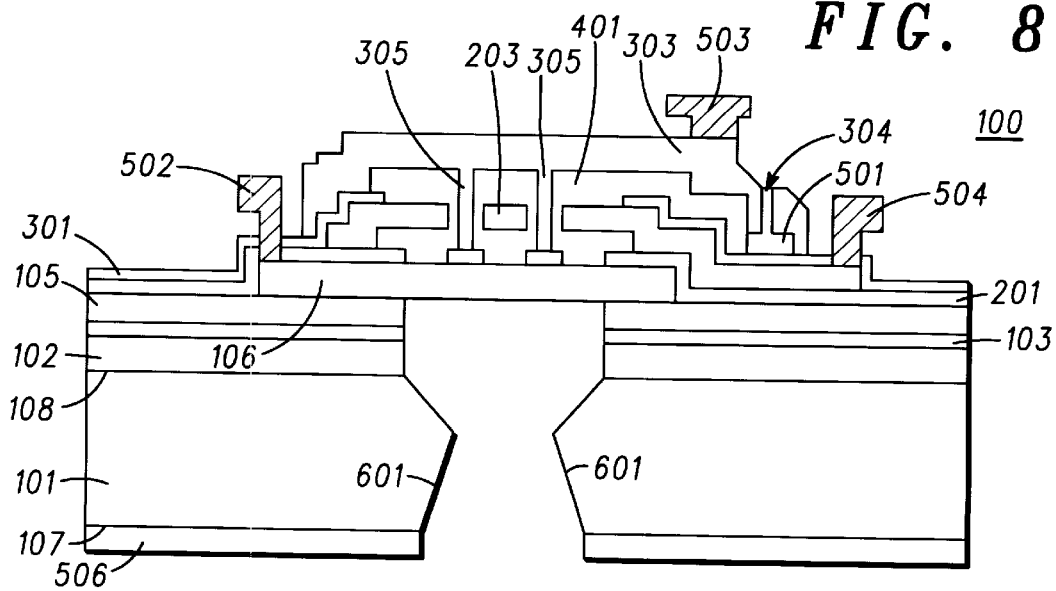

Next, FIG. 8 illustrates component 100 after several additional manufacturing steps. Etch mask 505 is removed to expose electrical contacts 502, 503, and 504. In the preferred embodiment, a portion of etch stop 105 directly above hole 601 is removed. Also in the preferred embodiment, most of cavity sealing layer 501 is removed, but a small portion of layer 501 remains in hole 304 of diaphragm 303 to keep cavity 401 sealed. Alternatively, only a portion of cavity sealing layer 501 directly above hole 601 is removed. With the aforementioned removal of layer 501, etch mask 505 and etch stop 105, portions of diaphragms 303 and 106 located directly above hole 601 are flexible or movable relative to substrate 101 and in a direction substantially perpendicular to surfaces 107 and 108 of substrate 101. Fixed electrode 203 remains immovable or stationary relative to substrate 101.

In an alternative embodiment, cavity sealing layer 501 is not etched or removed, and the portion of etch stop 105 directly above hole 601 is also not removed. This alternative embodiment provides electrical isolation of diaphragms 303 and 106 from the pressure sensing environment, but the flexibility of diaphragms 106 and 303 is reduced. To maintain a minimum amount of flexibility in diaphragm 303, hole 304 in diaphragm 303 is preferably not located over hole 601 so that when hole 304 is filled with cavity sealing layer 501, layer 501 does not directly contact or directly couple the portions of diaphragm 303 and electrode 203 that directly overlie hole 601.

As portrayed in FIG. 8, component 100 is a differential capacitive pressure sensor. Diaphragms 303 and 106 form a differential capacitive pressure sensing element or a sealed composite hollow diaphragm that contains a fixed electrode 203 inside. Diaphragms 303 and 106 are two flexible electrodes of the composite hollow diaphragm. As explained in more detail hereinafter, the sealed composite hollow diaphragm moves in response to a differential pressure. The sealed composite hollow diaphragm is supported by substrate 101 and directly overlies hole 601 in substrate 101.

During operation of component 100, diaphragm 303 is exposed to a first pressure and is isolated from a second pressure, and diaphragm 106 is exposed to the second pressure and is isolated from the first pressure. If the first pressure is greater than the second pressure, then diaphragm 303 will move or deflect toward fixed electrode 203. With posts 305 mechanically coupling diaphragms 303 and 106, as diaphragm 303 moves towards fixed electrode 203, posts 305 move or deflect diaphragm 106 away from fixed electrode 203. Posts 305 are preferably rigid or stiff to simultaneously move diaphragm 106 in a similar manner and the same distance that diaphragm 303 moves.

If the second pressure is greater than the first pressure, then diaphragm 106 will move toward electrode 203, and posts 305 will simultaneously move diaphragm 303 away from electrode 203. Electrode 203 will not move in response to either of the first or second pressures. As diaphragms 303 and 106 move toward or away from electrode 203, the capacitance between diaphragm 303 and electrode 203 changes in one direction, and the capacitance between diaphragm 106 and electrode 203 changes in an opposite direction. This differential capacitance can be measured by an integrated circuit in substrate 101 or on a separate substrate.

In summary, an improved semiconductor differential capacitive pressure sensing component or device has a sealed composite hollow diaphragm with a fixed electrode therein to detect changes in air, gas, or liquid pressure. The pressure sensing device described herein overcomes many disadvantages of the prior art. For example, the pressure sensing device has a smaller size because of the method of forming the hole within the support substrate. As another example, the size of the pressure sensing device is also reduced because the two flexible diaphragms overlap each other and do not overlie different portions of the underlying support substrate. In addition, the sealed composite hollow diaphragm eliminates the prior art problems of particulate contamination and moisture condensation during the manufacturing and operation of the pressure sensing device. Furthermore, the posts that mechanically couple the two flexible diaphragms prevent common mode pressure problems of prior art pressure sensors where two opposing flexible diaphragms may both deflect toward a middle fixed electrode. Moreover, the cost of the pressure sensing device is reduced because the two flexible diaphragms are not individually made from expensive materials such as sapphire. The cost is further reduced because the two flexible diaphragms are not assembled together using expensive, difficult, and inaccurate aligning techniques whereby the two diaphragms are bonded together with an adhesive or other bonding agent. Additionally, the use of a capacitive sensing technique reduces the temperature sensitivity of the pressure measurement and significantly increases the low pressure sensitivity compared to a piezoresistive sensing technique.

The semiconductor differential pressure sensing component described herein can be used in a variety of applications including, but not limited to, liquid and gas flow meters, consumer appliances such as washing machines, heating, ventilation, and air conditioning applications, and various automotive applications. Furthermore, the concepts presented herein are also applicable to other pressure sensing techniques such as tunneling tip devices, thermal detectors, piezoresistive devices, and barometric pressure sensors because the transduction mechanism is protected from the environment in which the pressure measurement is performed.

While the invention has been particularly shown and described mainly with reference to preferred embodiments, it will be understood by those skilled in the art that changes in form and detail may be made without departing from the spirit and scope of the invention. For instance, the numerous details set forth herein such as, for example, material compositions and specific etchants are provided to facilitate the understanding of the present invention and are not provided to limit the scope of the invention.

Additionally, FIG. 8 illustrates posts 305 electrically coupled to diaphragm 303. However, in an alternative embodiment, posts 305 can be electrically isolated from diaphragm 303 to reduce the parasitic capacitances between posts 305 and fixed electrode 203. The electrical isolation can be accomplished by disposing a silicon nitride or other dielectric layer between posts 305 and diaphragm 303. Instead of using a silicon nitride layer, an undoped polysilicon layer can be deposited for posts 305 and diaphragm 303, and then a dopant can be controllably diffused into diaphragm 303 but not substantially diffused into posts 305.

Furthermore, FIG. 8 portrays an exposed portion of fixed electrode 203 in cavity 401. However, in an alternative embodiment, isolation layer 301 can cover all of the top surface of fixed electrode 203 to prevent the electrical shorting of diaphragm 303 and fixed electrode 203 as diaphragm 303 moves toward fixed electrode 203 during the operation of component 100. Additionally, an extra isolation layer can be deposited after the formation of sacrificial layer 202 and before the formation of fixed electrode 203. This extra isolation layer prevents the electrical shorting of diaphragm 106 and fixed electrode 203 as diaphragm 106 moves toward fixed electrode 203 during the operation of component 100. In this alternative embodiment, fixed electrode 203 can be sandwiched between two isolation layers. In a different alternative embodiment, fixed electrode can remain exposed to cavity 401 while the bottom surface of diaphragm 303 and the top surface of diaphragm 106 are covered by different isolation layers.

Moreover, additional shielding structures can be incorporated into component 100 to provide electrostatic shielding for component 100. Also, an electrical contact can be coupled to substrate 101 to provide a fixed potential to substrate 101 for improved capacitance measurement accuracy.

Accordingly, the disclosure of the present invention is not intended to be limiting. Instead, the disclosure of the present invention is intended to be merely illustrative of the scope of the invention, which is set forth in the following claims.

What is claimed is:

1. A method of manufacturing a differential capacitor pressure sensor comprising:

providing a semiconductor substrate having first and second surfaces opposite each other;

depositing a layer of a semiconductor material in physical contact with the second surface of the semiconductor substrate;

forming a first movable diaphragm layer on the second surface of the semiconductor substrate wherein the first movable diaphragm layer forms a first electrode of the differential capacitor pressure sensor;

forming a fixed electrode layer having a first portion on the second surface of the semiconductor substrate and a second portion overlying the first movable diaphragm layer wherein the first fixed electrode layer forms a second electrode of the differential capacitor pressure sensor;

forming an isolation layer on the first portion of the fixed electrode layer;

forming a top movable diaphragm layer having a first portion on the isolation layer and a second portion overlying the second portion of the second portion of the fixed electrode layer wherein the top movable diaphragm layer forms a third electrode of the differential capacitor pressure sensor; and using an etchant to anisotropically etch a hole from the first surface of the semiconductor substrate through the semiconductor substrate, to isotropically etch the layer, and to anisotropically etch the second surface of the semiconductor substrate wherein the hole at the first and second surfaces of the semiconductor substrate is larger than the hole at an inner portion of the semiconductor substrate and wherein the etchant is supplied to the second surface of the semiconductor substrate only from the hole in the semiconductor substrate.

2. The method of claim 1 further comprising forming the hole underneath the first movable diaphragm layer.

3. The method of claim 2 wherein the forming step occurs before the using step.

4. The method of claim 2 wherein the forming step includes forming a plurality of posts wherein the first and second movable diaphragm layers form a sealed cavity therebetween, wherein the fixed electrode layer and the plurality of posts are located in the sealed cavity, and wherein the plurality of posts mechanically couple the first and second movable diaphragm layers.

5. The method of claim 1 wherein the providing step includes providing a semiconductor having a crystalline structure for the semiconductor substrate and wherein the depositing step includes providing the semiconductor having a polycrystalline structure for the layer.

6. The method of claim 1 wherein using the etchant further comprises using the etchant to remove the layer wherein the etchant is supplied to the layer only from the hole in the semiconductor substrate.

* * * * *